United States Patent
Lindquist et al.

(10) Patent No.: US 7,188,112 B1
(45) Date of Patent: Mar. 6, 2007

(54) METHOD, SYSTEM, AND APPARATUS FOR EXPOSING SERVER PROPERTIES TO A CLIENT APPLICATION

(75) Inventors: Joshua Lindquist, Bellevue, WA (US); Eric Barber Vigesaa, Seattle, WA (US); Li Wang, Kirkland, WA (US); Gloria Monroe Godfrey, Kirkland, WA (US); Wentao Chen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 466 days.

(21) Appl. No.: 10/661,193

(22) Filed: Sep. 12, 2003

Related U.S. Application Data

(63) Continuation-in-part of application No. 10/387,293, filed on Mar. 12, 2003.

(51) Int. Cl.
 *G06F 17/30* (2006.01)
(52) U.S. Cl. .............................. 707/10; 707/6; 709/203
(58) Field of Classification Search ................ 707/10, 707/100, 104.1, 200, 1–5, 6; 709/203
 See application file for complete search history.

(56) References Cited

U.S. PATENT DOCUMENTS

| | | | | |
|---|---|---|---|---|
| 6,304,918 | B1 | 10/2001 | Fraley et al. | 709/332 |
| 6,463,442 | B1 | 10/2002 | Bent et al. | 707/103 R |
| 6,519,764 | B1 | 2/2003 | Atkinson et al. | 717/120 |
| 2002/0124007 | A1* | 9/2002 | Zhao | 707/102 |
| 2003/0126088 | A1* | 7/2003 | Mineyama | 705/51 |

OTHER PUBLICATIONS

W.R. Stanek, "Energizing Your Web Pages" (the Liveconnect Technology In Netscape's Open Network Environment and Microsoft's ActiveX Technology for Creating Dynamic Web Pages), *PC Magazine*, Sep. 1997, vol. 16, No. 15, p. 247.

Z. Oliphant, "Plug-Ins For Netscape Navigator: Extend Navigator and Internet Using The Plug-In API," *PC Magazine*, Feb. 1997, vol. 16, No. 3, p. 233.

R. Dragan, "Plugging In: The Live connect/Plug-In SDk 3.0, The Netscape Navigator Platform," *PC Magazine*, Oct. 1996, vol. 15, No. 17, p. 284.

G. Attardi, A. Cistemino, A. Yonezawa, S. Matsuoka, "Template Metaprogramming An Object Interface To Relational Tables," REFLECTION 2001 International Conference, Lecture Notes In Computer Science, Sep. 2001, p. 266-267.

(Continued)

*Primary Examiner*—Greta Robinson
*Assistant Examiner*—Cheryl Lewis
(74) *Attorney, Agent, or Firm*—Merchant & Gould

(57) ABSTRACT

A method, system, apparatus, and computer-readable medium are provided for exposing and utilizing property values maintained at a server computer. A request is received at the server computer for a resource, such as a Web page. In response to receiving the request, a determination is made by the server computer as to whether a property value maintained at the server computer should be returned with the resource. If the property value should be returned with the resource, the current value of the specified property is retrieve and is rendered into the resource as a variable statement specifying the current value of the property. The resource, including the variable statement, is then returned to the requesting application where it may be utilized.

21 Claims, 11 Drawing Sheets

OTHER PUBLICATIONS

G. Xiao-Lin, Q. Xiao-Lin, Q. De-Pei, "Binding Agents Supporting Inter-Object Commnuication For Internet-Based Meta System," *Chinese Journal of Computers*, Jan. 2000, vol. 25, No. 1, p. 100-105. (Abstract Only).

H. Fahmi, "Distributed Web-Based Framework for Real-Time Multimedia Object Communication", *Computer Systems Science and Engineering*, Purdue University, W. Lafayette, Mar. 2001, vol. 16, No. 2, p. 79-88.

L. Courtrai, Y. Maheo, F. Raimbault, "Java Objects Communication On a High Performance Network," Proceedings Ninth Euromicro Workshop On Parallel and Distributed Processing, IEEE Computer Society, Feb. 2001, p. 203-210.

* cited by examiner

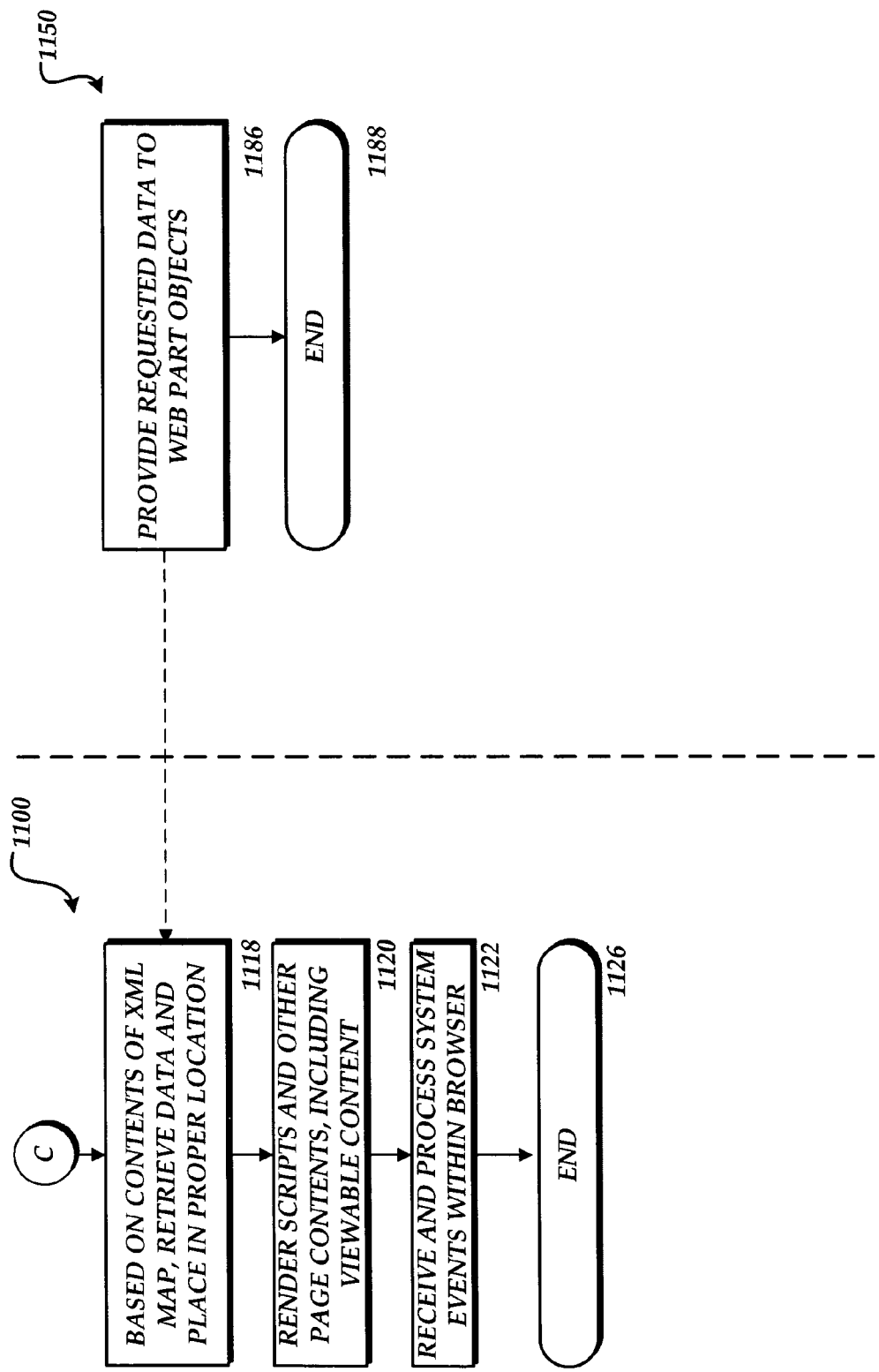

METHOD, SYSTEM, AND APPARATUS FOR EXPOSING SERVER PROPERTIES TO A CLIENT APPLICATION

CROSS-REFERENCE TO RELATED APPLICATIONS

This application is a continuation-in-part of co-pending U.S. patent application Ser. No. 10/387,293, filed Mar. 12, 2003, and entitled "METHOD, SYSTEM, AND APPARATUS FOR IMPLEMENTING OBJECT INTERFACES AT RUNTIME", which is expressly incorporated herein by reference.

TECHNICAL FIELD

The invention relates generally to the field of client-server communication and, more specifically, to the field of providing server properties to a client application program.

BACKGROUND OF THE INVENTION

During the infancy of the World Wide Web ("WWW" or the "Web"), hyper-text markup language ("HTML") was used almost exclusively for the presentation of Web pages within a Web browser. However, due to the limitations of HTML, technologies were created that enable the presentation of more robust information than permitted by HTML. These technologies, such as JAVA from SUN MICROSYSTEMS® and ACTIVEX® from MICROSOFT CORPORATION®, allow client-side browser objects to be created that provide functionality not possible through the use of only HTML. JAVA applications ("applets") and ACTIVEX® controls executing within a Web browser can provide rich graphics, animation, dynamic content, continuously updated content, and other types of robust data presentation not previously possible using only HTML. Web part objects ("Web parts") can also provide dynamic content, interoperability with other Web part objects, and robust communication with server-side components. These types of client-side browser objects have greatly enhanced the presentation capabilities of today's Web browsers.

One difficulty encountered when utilizing client-side browser objects occurs when it is desirable for a client-side browser object to utilize property values that are utilized by a server-side component. For instance, in one scenario a server-side component may maintain a property that identifies a uniform resource locator ("URL") for a database interface to be utilized in conjunction with a Web site. The URL may be utilized by a client-side browser object to locate a source of data to be displayed within a Web page. However, if the property is maintained by the server-side component, it can be very difficult to expose the value of the property to the client-side browser object in a manner that easily allows the client-side object to make use of the property value.

It is with respect to these considerations and others that the present invention has been made.

SUMMARY OF THE INVENTION

In accordance with the present invention, the above and other problems are solved by a method, system, apparatus, and computer-readable medium for exposing and utilizing property values maintained at a server computer. According to one aspect of the invention, a request may be received at a server computer for a resource, such as a Web page. In response to receiving the request, a determination is made by the server computer as to whether a property value maintained at the server computer should be returned with the resource. If the property value should be returned with the resource, the current value of the specified property is retrieved and is rendered into the resource as a variable statement specifying the current value of the property. The resource, including the variable statement, is then returned to the requesting application where it may be utilized.

According to another aspect of the invention, determining whether a property value maintained at the server computer should be returned with the resource may include determining whether a data file, called a solution specification file, associated with the page includes a tag indicating that a property value should be returned with the resource. The tag may include a parameter identifying the name utilized by the server computer to identify the property value. Additionally, the tag may include a parameter identifying a name that should be utilized to refer to the property value within the variable statement.

According to yet another aspect of the invention, a computer-readable medium having an extensible markup language ("XML") data structure stored thereon is provided for use in exposing a property value stored at a server computer to a client computer. The data structure includes a server property tag indicating whether a property value maintained at the server computer should be exposed to the client computer within a resource requested by the client computer. The server property tag may also include a property parameter that identifies the name utilized by the server computer to identify the property value. Additionally, the server property tag may also include a name parameter that identifies the name that should be utilized by the client computer to refer to the property value within a variable statement.

Other aspects of the invention relate to systems, apparatus, methods, schema, and data structures utilized for exposing a property value maintained at a server computer to a client application. The invention may also be implemented as a computer process, a computing system, or as an article of manufacture such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIGS. 7A–7D are flow diagrams that illustrate an operational process performed by a client computer and a server computer for exposing and utilizing server properties according to one embodiment of the present invention.

DETAILED DESCRIPTION OF THE INVENTION

Figure 1:
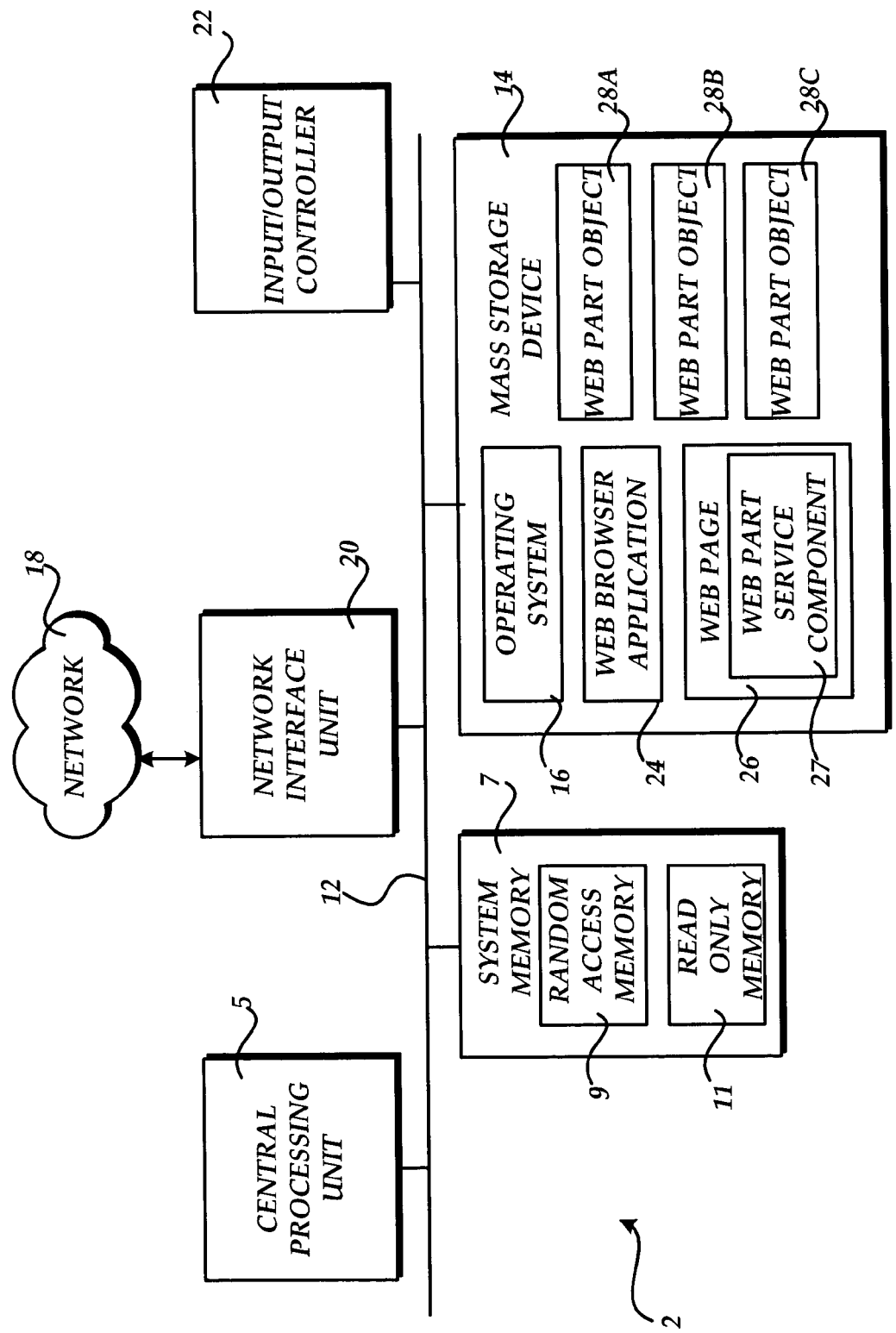
FIGS. 1 and 2 are computer architecture diagrams that illustrate a computer architecture and various software components utilized by a client computer and a server computer, respectively, in embodiments of the present invention.

Referring now to the drawings, in which like numerals represent like elements, a computer hardware and software architecture utilized by several computers provided in the various embodiments of the invention will be described. In particular, FIGS. 1 and 2 and the corresponding discussion are intended to provide a brief, general description of a suitable computing environment in which embodiments of the invention may be implemented. While the invention will be described in the general context of program modules that execute in conjunction with program modules that run on an operating system on a personal or server computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a client computer 2 utilized in the various embodiments of the invention will be described. The computer architecture shown in FIG. 1 illustrates a conventional desktop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The client computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media, provide non-volatile storage for the client computer 2. Although the description of computer-readable media contained herein refers to a mass storage device, such as a hard disk or CD-ROM drive, it should be appreciated by those skilled in the art that computer-readable media can be any available media that can be accessed by the client computer 2 or the server computer 30, described below.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the client computer 2 or the server computer 30, described below.

According to various embodiments of the invention, the client computer 2 may operate in a networked environment using logical connections to remote computers, such as the server computer 30, through a network 18, such as the Internet. The client computer 2 may connect to the network 18 through a network interface unit 20 connected to the bus 12. It should be appreciated that the network interface unit 20 may also be utilized to connect to other types of networks and remote computer systems. The client computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the client computer 2, including an operating system 16 suitable for controlling the operation of a networked personal computer, such as the WINDOWS XP® operating system from MICROSOFT CORPORATION® of Redmond, Wash. The mass storage device 14 and RAM 9 may also store one or more program modules. In particular, the mass storage device 14 and the RAM 9 may store a Web browser application program 24 ("Web browser"). The Web browser 24 comprises an application program capable of requesting and rendering Web pages created in HTML or other types of markup languages, such as the Web page 26. Examples of such Web browsers are the INTERNET EXPLORER® Web browser from MICROSOFT CORPORATION® and the NETSCAPE® NAVIGATOR Web browser from NETSCAPE® CORPORATION.

The Web browser 24 is also capable of executing scripts through the use of a scripting host. The scripting host executes program code expressed as scripts within the browser environment. For instance, INTERNET EXPLORER® is capable of executing program code written in the JSCRIPT programming language from MICROSOFT CORPORATION®. As known to those skilled in the art, JSCRIPT is a general-purpose object-based scripting language. Other Web browsers are capable of executing program code written in similar scripting languages in a similar fashion.

According to one embodiment of the invention, the Web browser 24 is operative to receive a Web page 26 that includes a WPSC 27. As described briefly above, the WPSC 27 is an intermediary object that mediates communication between client side objects executing in conjunction with the Web browser 24. More particularly, the WPSC 27, is utilized in conjunction with Web Part Page technologies from MICROSOFT CORPORATION®. For example, the WINDOWS SHAREPOINT SERVICES ("WSS") and SHAREPOINT PORTAL SERVICES ("SPS") portal applications utilize the WPSC 27 for inter-object communication on the client computer 2. The WPSC 27 provides a standard framework for communication between client side objects, allows client side objects to discover one another, provides session state management, state management, and item retrieve facilities. The WPSC 27 is typically rendered in JSCRIPT as a hidden object present in each Web page 26 utilized within a Web site utilizing Web part technology. Additional details regarding the creation and utilization of the WPSC 27 will be provided below.

The Web browser 24 is also operative to execute one or more client side objects. As discussed briefly above, client side objects are executable objects that may be identified in a Web page 26 and executed in conjunction with the rendering of the Web page 26. For instance, JAVA applets or ACTIVEX® controls may be identified on a Web page 26 and rendered by the Web browser 24 to generate a portion of the display for the Web page 26.

According to one embodiment of the invention, the Web browser 24 is further operative to utilize client side objects called Web part objects 28A–28C (also referred to herein as "Web parts"). Web part objects 28A–28C are client side objects that stand alone and that are configured for use with the WPSC 27. Web parts 28A–28C are reusable components that contain Web-based content such as extensible markup language ("XML"), HTML, and scripts. Web parts 28A–28C have a set of standard properties that control how they are rendered. These properties make Web parts storage-neutral and completely reusable. Because Web parts adhere to a common standard, they may be stored in libraries that may be utilized to create a variety of Web pages 26. Web pages 26 that include Web part objects 28A–28C may be referred to herein as Web Part Pages. Additional details regarding the structure and use of the Web parts 28A–28C will be described in greater detail below.

According to one embodiment of the invention, the Web part objects 28A–28C are operative to provide spreadsheet functionality within a Web page 26. In particular, the Web part objects 28A–28C are operative to provide functionality similar to that provided by a desktop spreadsheet application program such as the EXCEL® spreadsheet application from MICROSOFT CORPORATION®. As will be described in greater detail below, according to embodiments of the invention, the Web part objects 28A–28C utilize the value of a property maintained at the server computer 30 to locate data to be displayed. Additional details regarding the process performed by the server computer 30 to expose the property value and the utilization of the value by the Web part objects 28A–28C will be provided in greater detail below. It should be appreciated that although the Web part objects 28A–28C are described herein as providing spreadsheet functionality, Web part objects may provide other types of functionality. Property values exposed by a server computer may be utilized by these other types of Web part objects in a manner similar to that described herein.

Figure 2:
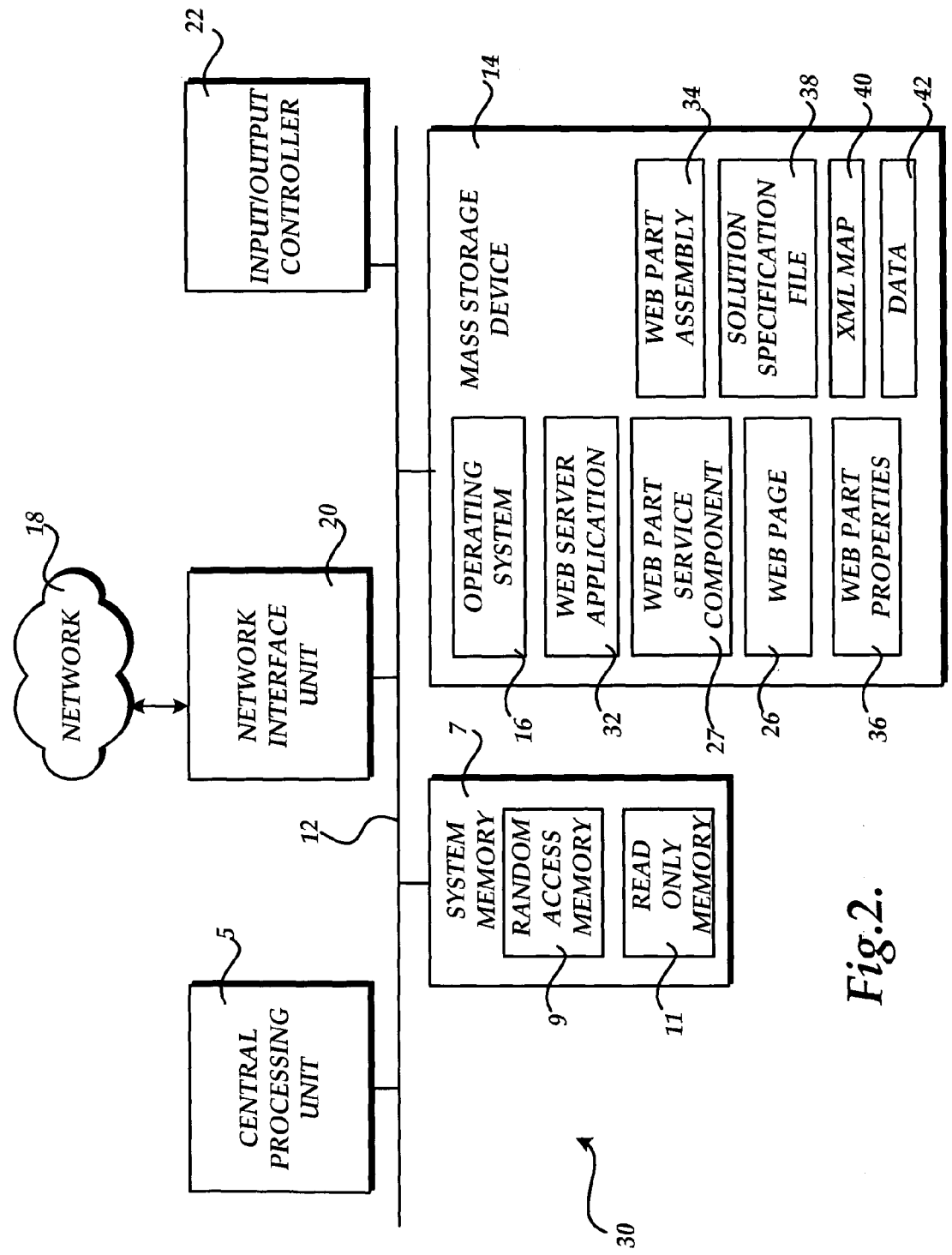

Referring now to FIG. 2, a server computer 30 utilized in the various embodiments of the invention will be described. As shown in FIG. 2, the server computer 30 includes many of the conventional computing components included in the client computer 2 and described above with respect to FIG. 1. In particular, the server computer 30 includes a CPU 5, a network interface unit 20 connected to a network 18, such as the Internet, a system memory 7 and a mass storage device 14. The mass storage device 14 utilized by the server computer 30 is operative to store an operating system 16 suitable for controlling the operation of a server computer. For instance, the operating system 16 may comprise the WINDOWS® SERVER 2003 operating system from MICROSOFT CORPORATION®.

The mass storage device 14 is also operative to store program modules for building and serving Web Part Sites. In particular, the mass storage device 14 may include the WSS or SPS portal applications from MICROSOFT CORPORATION®. As a part of the WSS or SPS applications, the server computer 30 may utilize a Web server application 32. According to one embodiment of the invention, the Web server application 32 comprises the INTERNET INFORMATION SERVER application from MICROSOFT®. It should be appreciated, however, that other types of Web server applications may be utilized.

The Web server application 32 receives and responds to requests from client computers, such as the client computer 2, for Web pages 26 located at or accessible to the server computer 30. It should be appreciated that Web pages as described herein include both pages stored statically, such as those utilizing only HTML, and those generated dynamically through the use of server side scripting technologies, such as ACTIVE SERVER PAGES configured for use within the .NET environment ("ASP.NET" or "ASPX") from MICROSOFT CORPORATION®.

According to the various embodiments of the invention, the Web server application 32 may receive requests for Web pages 26 that utilize one or more Web parts 28A. As discussed above, Web parts comprise client-side objects that may be used by a Web browser when displaying a Web page 26. In conjunction with the provision of Web part objects 28, the Web server application 32 may render and serve a WPSC 27. The WPSC 27 may be rendered as a hidden object within the Web page 26 and provided to a client computer 2. Additional details regarding the rendering of the WPSC 27 and the Web page 26 will be provided in greater detail below.

The mass storage device 14 utilized on the server computer 30 may also store Web part properties 36 associated with the Web part object 28A. The Web part properties 36 may be set by a solutions developer and contain data regarding the operation of the Web part object 28A. According to one embodiment of the invention, the Web part properties 36 include the location of a solution specification file 38 on the mass storage device 14 or located elsewhere. The solution specification file 38 includes data indicating whether one or more object interfaces should be implemented for the Web part object 28A at runtime.

The solution specification file 38 may also include a pointer to an XML map 40. The XML map 40, also called the XML spreadsheet file herein, may be utilized by the Web part object 28A to locate a source of data 42 for processing or display. Additionally, the XML map 40 indicates to the Web part object 28A the manner in which the retrieved data should be displayed. As will be described in greater detail below, the XML map 40 is located by the Web server application 32 and rendered into the Web page 26 prior to transmission to a requesting client computer 2.

The mass storage device 14 is also operative to store a Web Part Assembly 34 ("WPA"). The WPA 34 executes on the server computer 30 in conjunction with the Web server application 32. The WPA 34 communicates with the Web part object 28A executing on the client computer 2. Together, the WPA 34 and the Web part object 28A can provide functionality for performing tasks both on the client computer 2 and on server computer 30. Additional details regarding the operation of the WPA 34 in conjunction with the Web part object 28A will be described in greater detail below.

Figure 3A:
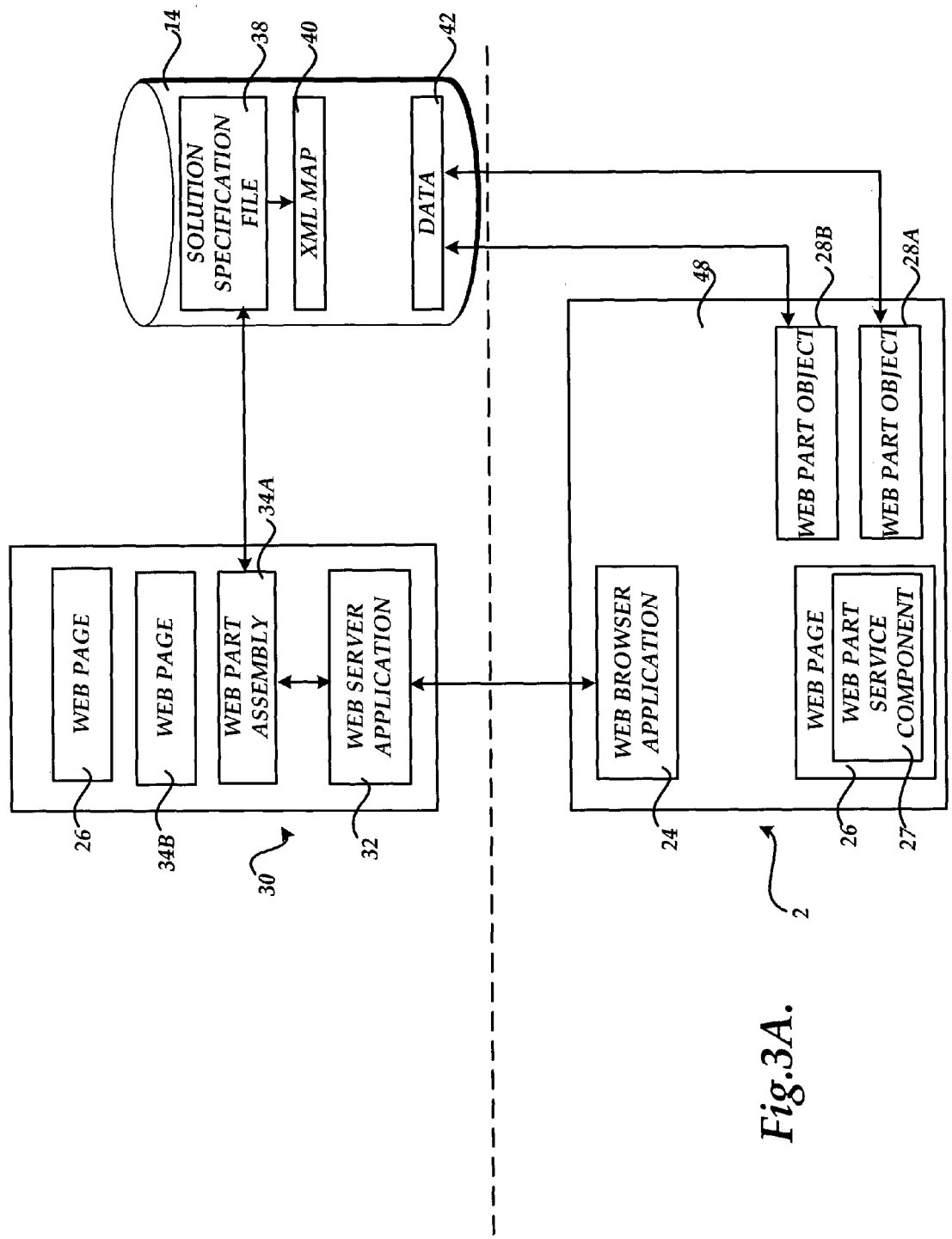
FIG. 3A is a block diagram that shows aspects of the interaction between software components executing on a client computer and components executing on a server computer in one embodiment of the invention.

Turning now to FIG. 3A, additional details regarding the operation of the client computer 2 and the server computer 30 in conjunction with the provision of a Web Part Site will be described. As shown in FIG. 3A, the Web browser application 24 may be utilized by a user to request a Web page 26 from the Web server application 32. In particular, the Web page 26 requested may include a reference to one or more Web part assemblies 34 which, in turn, reference the appropriate Web part objects 28A–28B. In the examples described herein, the Web page 26 includes a reference to a Web part assembly 34A which, in turn, references the Web part object 28A that provides data to other Web parts and a reference to a Web part assembly 34B that references the Web part objects 28A–28B.

When a request is received at the Web server application 32 for the Web page 26, the Web server application 32 recognizes that the Web page 26 includes a reference to a Web part assembly 34. Accordingly, the Web server application 32 passes the request to the WPA 34. The WPA 34 then determines, based on the Web part properties 36, the location of a solution specification file 38 associated with the Web part object 28A. As described above, the solution specification file includes a pointer to an XML map 40. The XML map 40 is utilized by the Web part object 28A when executing on the client computer 2 to locate, retrieve, and format data.

Once the WPA 34 has located the solution specification file 38 and the XML map 40, the contents of these two files are utilized by the Web server application 32 to render a portion of the contents of the Web page 26. In particular, according to embodiments of the invention, the Web server application 32 may also render into the Web page 26 HTML, XML, references to non-Web part client side objects, and other types of content that may be utilized by the Web browser application 24 to display the Web page 26. This data, referred to herein as "arbitrary HTML", may be set forth in the solution specification file 38 for inclusion in the Web page 26.

According to one embodiment of the invention, the solution specification file 38 may also include an XML tag that indicates to the WPA 34 that one or more values of the Web site properties should be rendered into the page as script. If such a tag is encountered by the WPA 34 when rendering the solution specification file 38, the WPA 34 will locate the current value of the identified property and render script into the Web page 26 that provides the property value. This may be rendered into the Web page 26 prior to the rendering of any other HTML or script set forth in the solution specification file 38 for inclusion in the Web page 26. Additional details regarding the contents of the solution specification file 38 and the Web page 26 will be described below with respect to FIGS. 4 and 5.

Once the Web server application 23 has completed rendering the Web page 26, the Web page 26 is transmitted to the Web browser 24 in response to the original request. The Web part objects 28A–28B may then utilize script to make use of the property value rendered into the Web page 26 by the WPA 34. Additional details regarding the functionality performed at the client computer 2 following the receipt of a Web page 26 that includes Web part objects 28A–28B, including the utilization of a property value rendered into the Web page 26 by the WPA 34, will be described below with respect to FIGS. 7A–7D.

Figure 3B:
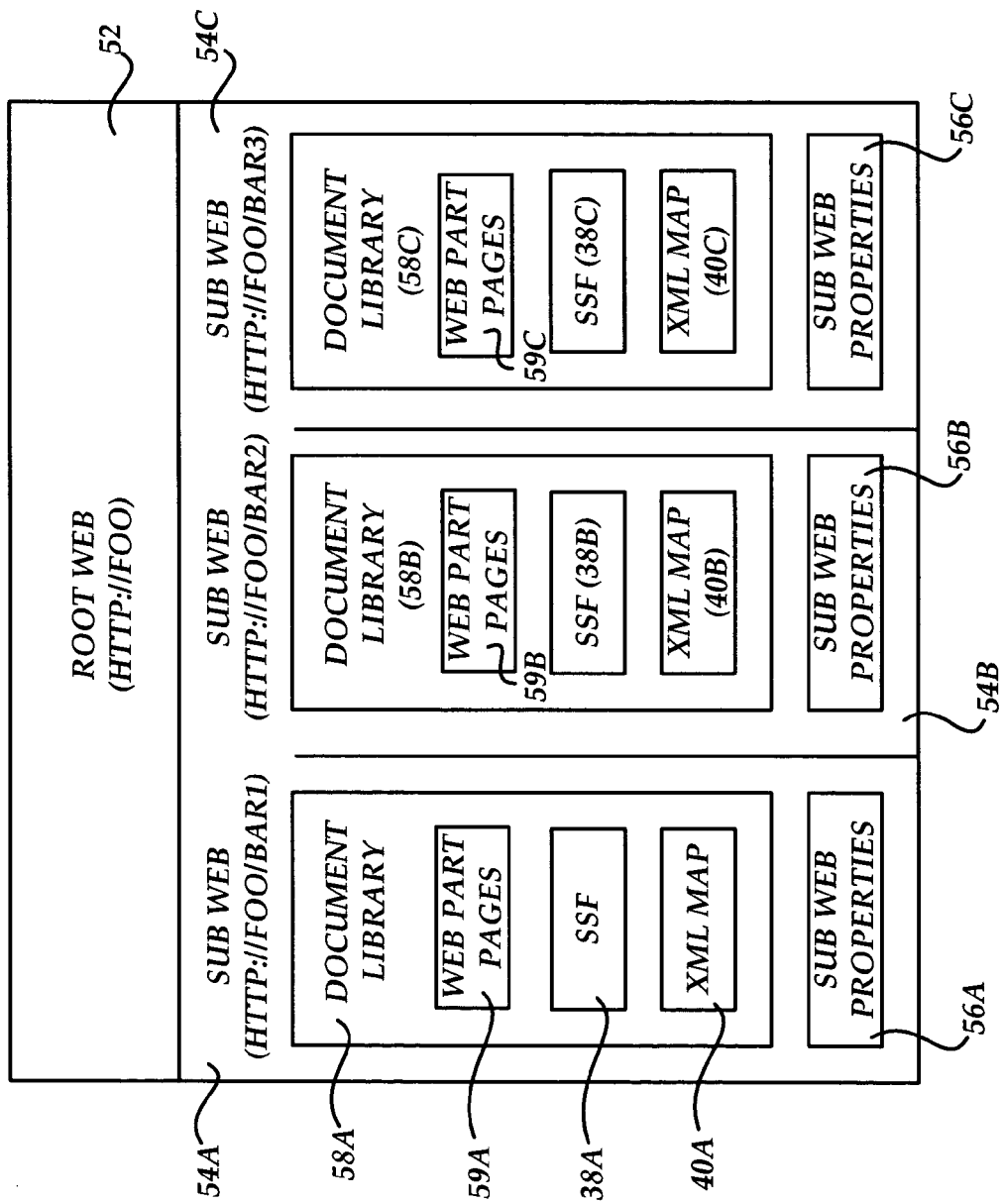
FIG. 3B is a block diagram that illustrates a Web domain architecture for providing Webs and sub-Webs in the various embodiment of the invention.

Referring now to FIG. 3B, a Web domain architecture for providing Webs and sub-Webs having Web Part Pages 59A–59C in the various embodiment of the invention will be described. As shown in FIG. 3B, Web Part Pages 59A–59C may be organized into a root Web 52 and one or more sub-webs 54A–54C. Each sub-web may maintain its own document library 58A–58C containing a solution specification file 38A–38C, an XML map 40A–40C, Web part pages 59A–59C, and other documents. Additionally, each sub-web 54A–54C may also include sub-web properties 56A–56C. The sub-web properties 56A–56C comprise properties utilized within each of the sub-webs 54A–54C, respectively. Utilizing the various embodiments of the invention, the values of the sub-web properties 56A–56C may be exposed to client objects when loading Web Part Pages 59A–59C from each of the sub-webs. Additional details regarding this process will be provided below.

Figure 4:
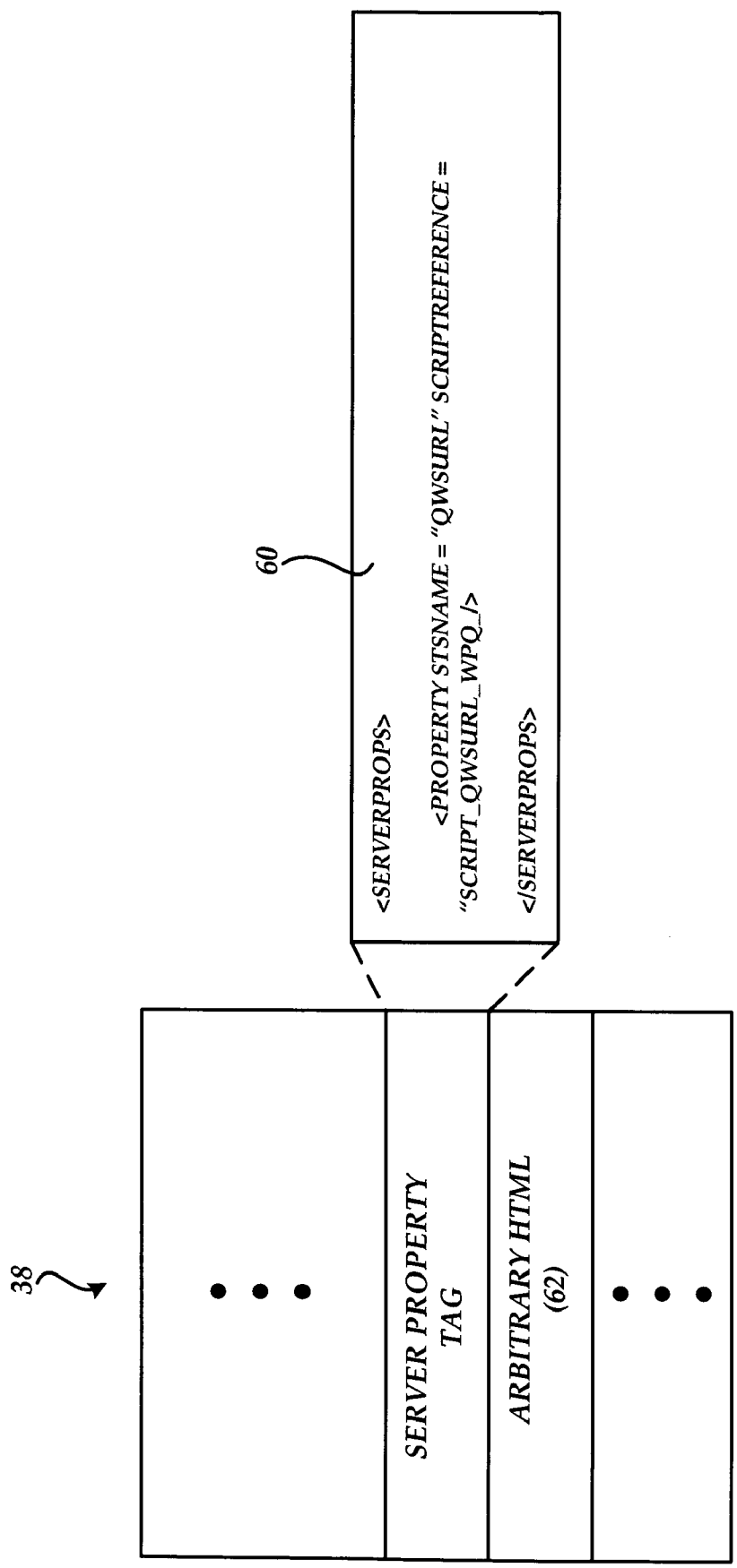
FIG. 4 is a block diagram that illustrates a portion of the contents of a solution specification file provided by and utilized in the various embodiments of the invention.

Turning now to FIG. 4, additional details regarding the contents of the solution specification file 38 utilized in the various embodiments of the invention will be provided. As shown in FIG. 4 and briefly described above, the solution specification file 38 may include an XML tag, or other type of identifier, that instructs the WPA 34 to include the property value for one or more server properties in the rendered Web page 26. In particular, according to one embodiment of the invention, the solution specification file 38 includes an XML tag 60 called "<SERVERPROPS>" that indicates to the WPA 34 that the value of a server property should be rendered into the Web page 26. The XML tag 60 includes a parameter called "STSNAME" that identifies the server side property that should be rendered into the Web page 26. For instance, in the example shown in FIG. 4, the "STSNAME" parameter identifies a property called "QWSURL" as the server property that should be included when the Web page 26 is rendered.

According to embodiments of the invention, the XML tag 60 may include an optional parameter that allows the variable name used within the script present within the Web page 26 to be specified. In particular, a parameter called "SCRIPTREFERENCE" may be included that identifies a variable name. When the WPA 34 renders the contents of the solution specification file 38, the value of the "SCRIPTREFERENCE" parameter is utilized to form the variable name for the value of the variable specified by the "STSNAME" parameter. For instance, when the example XML tag 60 shown in FIG. 4 is rendered, the Web page 26 will include a variable statement setting the value of a variable named "SCRIPT_QWSURL_WPQ" to the value of the property called "QWSURL" on the server computer. This variable statement will be rendered prior to other script in the Web page 26 so that it is available for use by other script present in the page. Additional details regarding the contents of the Web page 26 following the rendering of the solution specification file 38 by the WPA 34 will be provided below with reference to FIG. 5.

According to various embodiments of the invention, additional data may be set forth in the solution specification file 38. This data, which may be referred herein to as arbitrary code or arbitrary HTML 62 in HTML applications, may be used to modify a Web part, including adding, deleting, or modifying, elements, events, registrations, and/or displays. Such arbitrary HTML 62 may be used to add various features such as buttons, functions, images, selection boxes, or other web elements. Additionally, arbitrary HTML 62 may be used to modify existing elements of a Web part. Accordingly, spreadsheet headings, listbox titles, and the like may be modified or changed using arbitrary HTML 62. As discussed above, the arbitrary HTML 62 is rendered into the Web page 26 by the WPA 34. Any variable statements rendered into the Web page 26 as the result of a server property XML tag 60, however, are rendered into the Web page 26 prior to the rendering of the arbitrary HTML 62.

Figure 5:
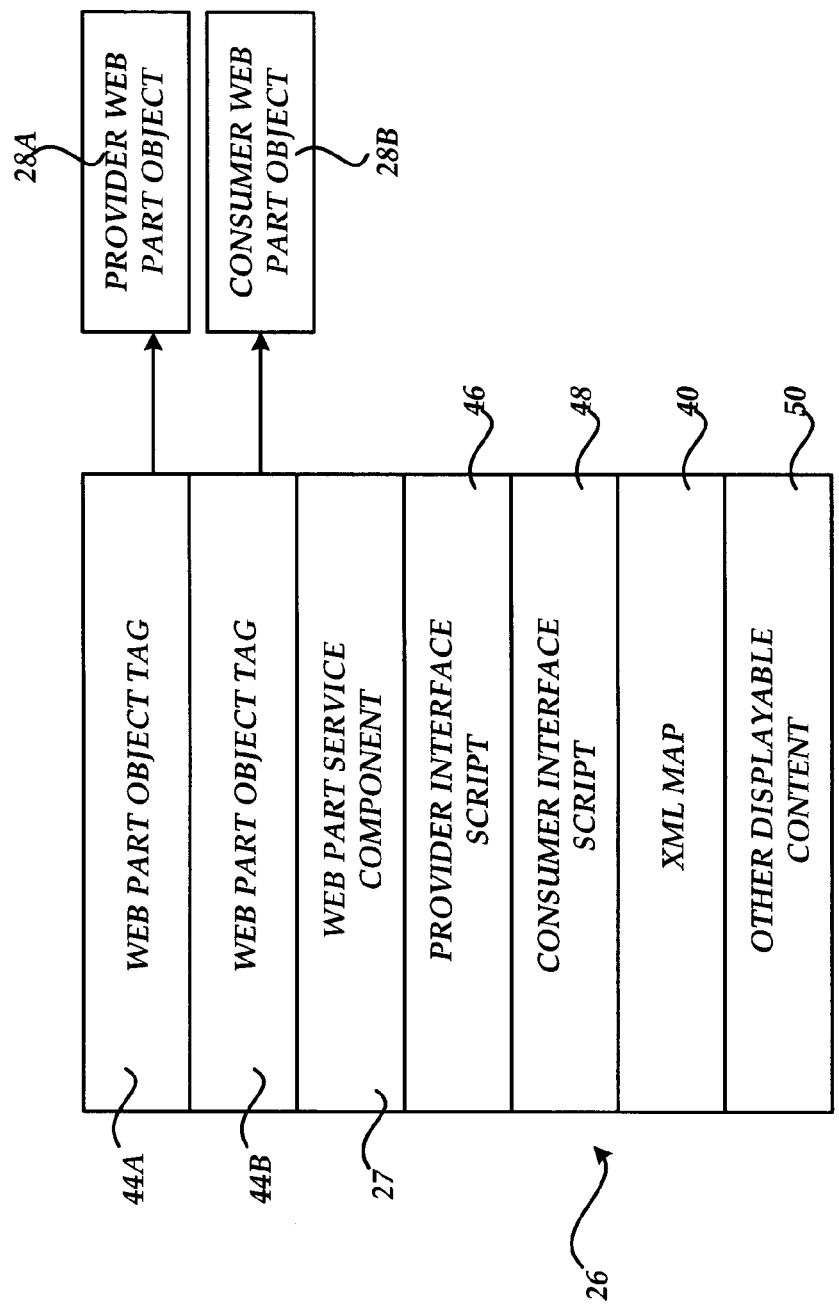
FIG. 5 is a block diagram that shows the contents of a Web page generated by a server computer and utilized in one embodiment of the present invention.

Referring now to FIG. 5, an illustrative Web page 26 rendered by the WPA 34 and the Web server application 32 in response to a request from the client computer 2 for the Web page 26 will be described. As discussed above, the Web page 26 includes references to the Web part objects 28A–28B. Accordingly, the Web server application 32 renders object tags 44A–44B into the Web page 26. The object tags 44A–44B direct the Web browser application 24 to an instance of the Web part objects 28A–28B. By executing the object tags 44A–44B, the Web browser application 24 can instantiate the Web part objects 28A–28B.

In addition to the object tags 44A–44B, the Web server application 32 also renders into the Web page 26 the WPSC 27. As described briefly above, the WPSC 27 is rendered as a hidden object in the Web page 26. The WPSC 27 acts as an intermediary between the Web part objects 28A–28B rendered on the page and allows, among other things, inter-object communication. As discussed above with respect to FIG. 3A, the WPA 34 retrieves the solution specification file 38 prior to rendering the Web page 26. The WPA 34 also determines, based on the contents of the solution specification file 38, whether one or more object interfaces should be implemented for each of the Web part objects 28A–28B referenced in the Web page 26. If the solution specification file 38 indicates that an interface should be rendered for any of the Web part objects 28A–28B referenced on the Web page 26, scripts are rendered into the Web page 26 for implementing these interfaces. The structure and use of the interface scripts 46 and 48 is detailed in U.S. patent application Ser. No. 10/387,293, filed Mar. 12, 2003, and entitled "METHOD, SYSTEM, AND APPARATUS FOR IMPLEMENTING OBJECT INTERFACES AT RUNTIME", which is expressly incorporated herein by reference.

As briefly discussed above, the solution specification file 38 includes a pointer to the XML map 40. The XML map 40 includes data for each of the Web parts 28A–28B that identify the location of a source of data to be utilized by the Web parts. Moreover, the XML map 40 specifies to the Web parts 28A–28B how the retrieved data should be formatted and displayed. Accordingly, the Web server application 32 renders into the Web page 26 the contents of the XML map 40. The Web server application 32 may also render into the Web page 26 other displayable content 50. This may include the arbitrary HTML 62 set forth in the solution specification file 38, other HTML, XML, references to non-Web part client side objects, or other types of content that may be utilized by the Web browser application 24 to display the Web page 26. Additional details in this regard are provided below with reference to FIG. 6.

Figure 6:
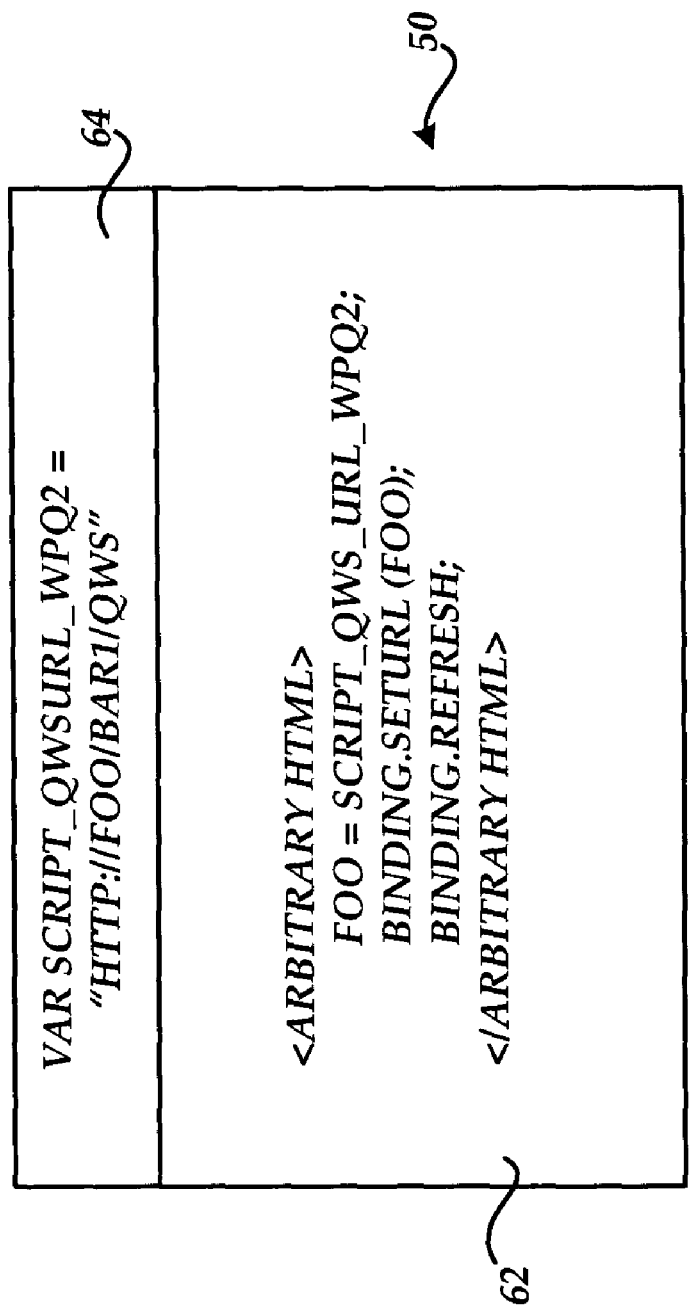
FIG. 6 is a block diagram illustrating additional aspects of the contents of a Web page generated by a server computer and utilized in one embodiment of the invention.
Figure 7A:
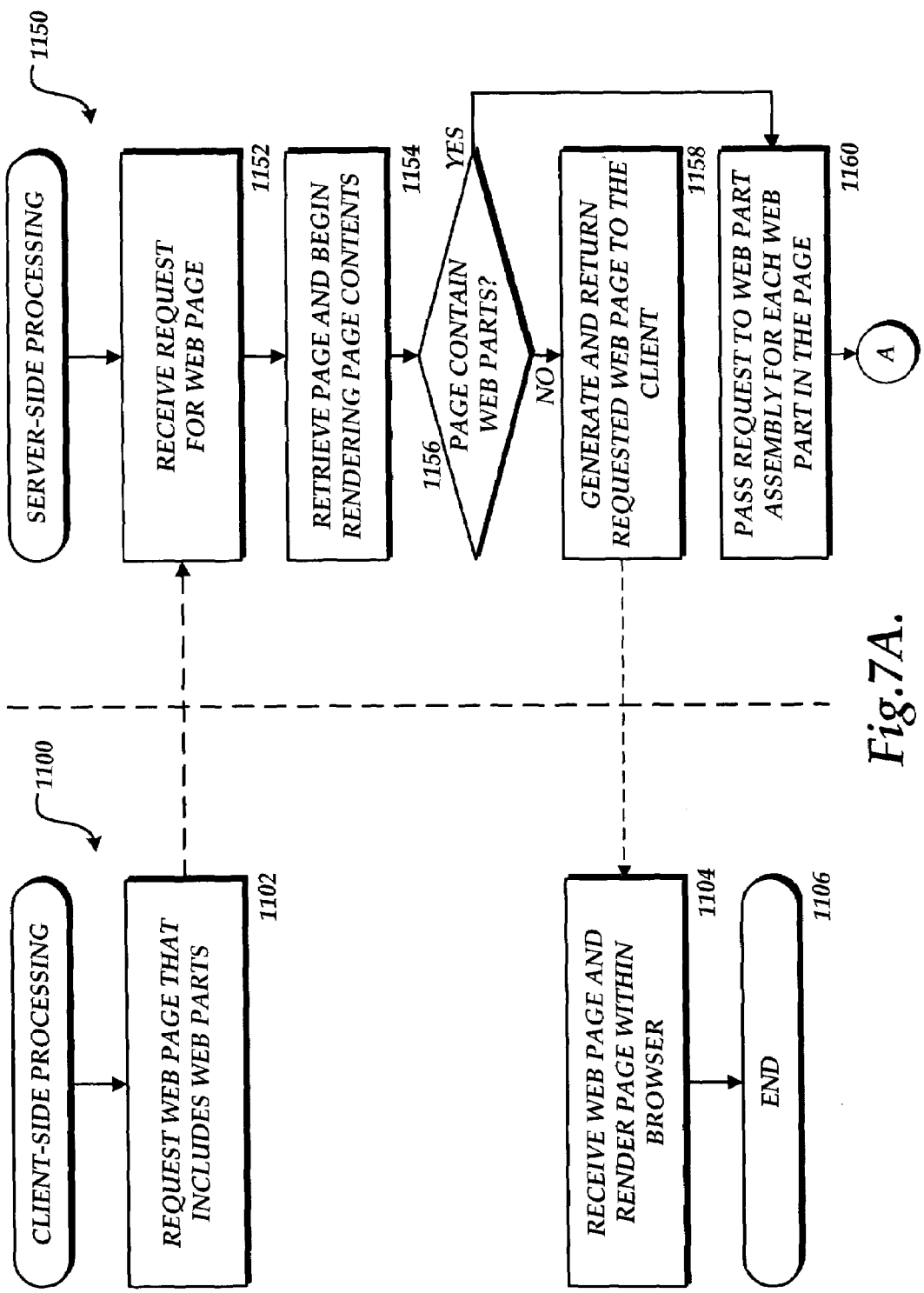
Figure 7B:
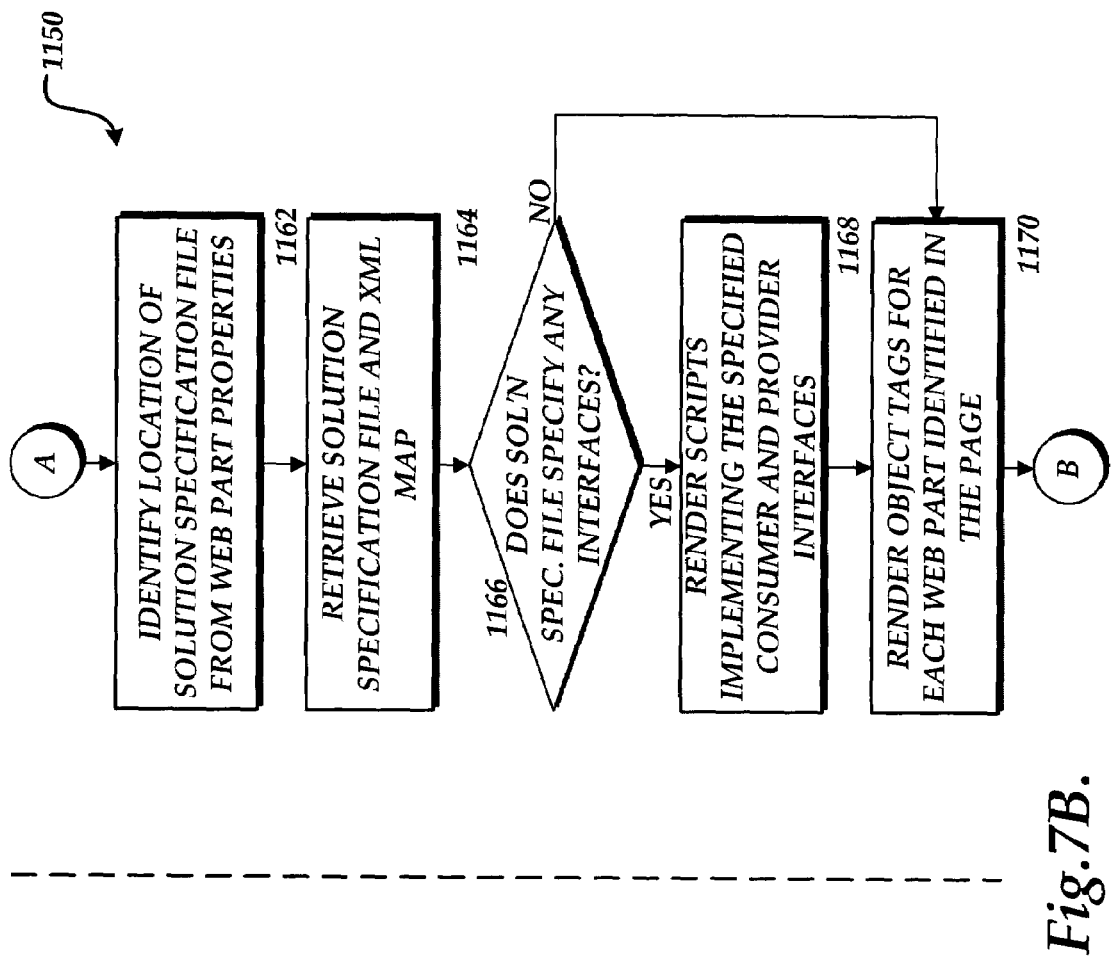
Figure 7C:
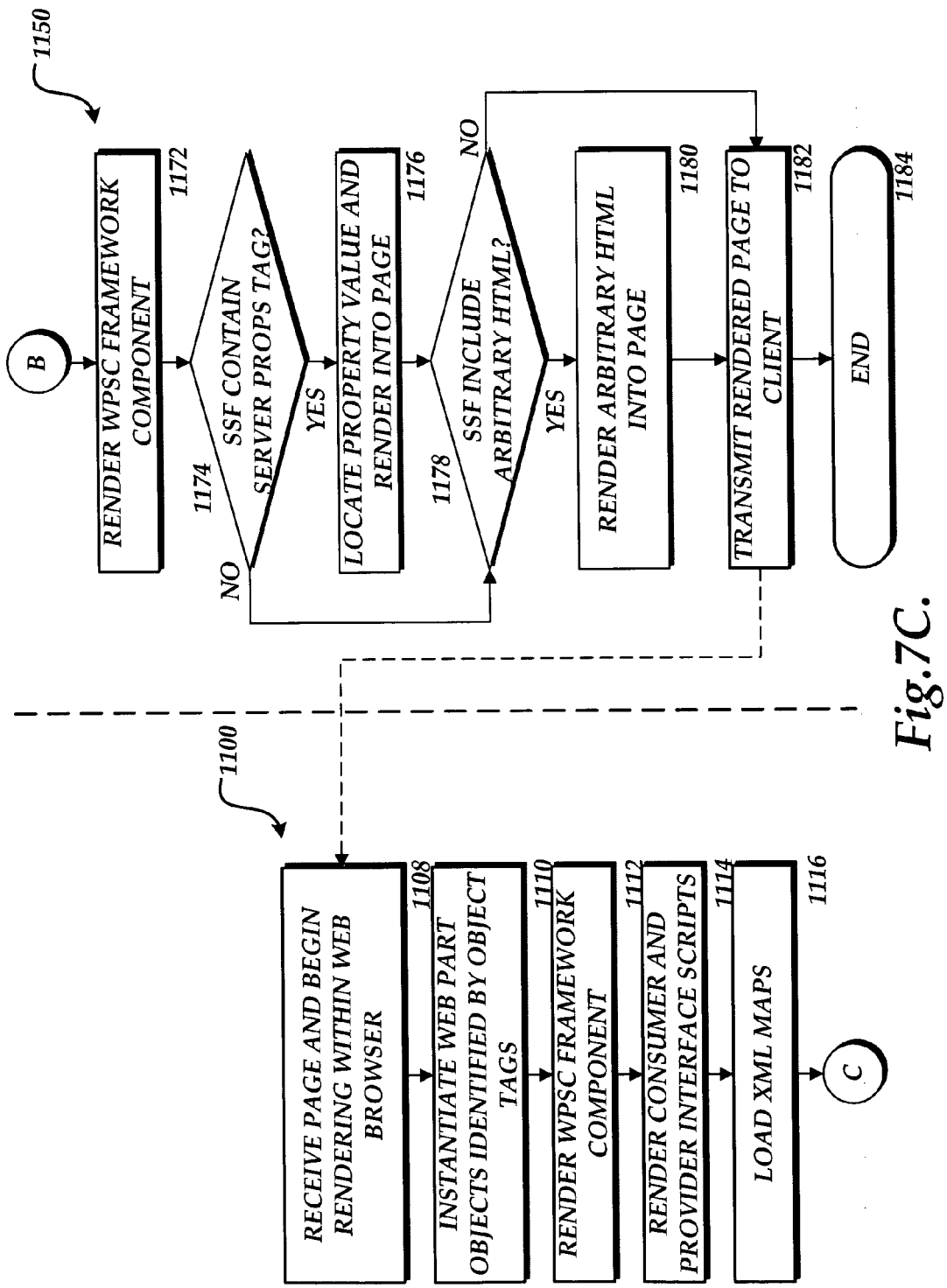

Turning now to FIG. 6, a portion of the contents of the Web page 26 following the rendering of a solution specification file 38 that includes an XML tag 60 identifying a server property to be exposed will be described. As shown in FIG. 6, the other displayable content 50 portion of the Web page 26 includes a variable statement 64. As discussed briefly above, the variable statement 64 is rendered into the Web page 26 as a result of the inclusion of the XML tag 60 in the solution specification file 38. The variable statement 64 includes a variable name, specified by the "SCRIPTREFERENCE" parameter and an assigned value equivalent to the value of the property identified by the "STSNAME" parameter at the time the solution specification file 38 is rendered. Accordingly, in the example illustrated in FIGS. 4 and 6, the variable named "SCRIPT_QWSURL_WPQ2" is assigned a value of "HTTP://FOO/BAR1/QWS."

The arbitrary HTML 62 is also rendered into the Web page 26. As discussed above, the arbitrary HTML 62 is set forth in the solution specification file 38 and is rendered into the Web page 26 following the rendering of any variable statements 64. As set forth in FIG. 6, the arbitrary HTML 62 may include code that utilizes the value of the variable identified in the variable statement 64 to perform some function. For instance, as shown in FIG. 6, the value of the variable set forth in the variable statement 64 may be utilized to update the location of a data object. It should be appreciated that multiple variable statements may be generated in a similar manner. Moreover, it should be appreciated that the value of the variable set forth in the variable statement 64 may be used in any manner possible with a variable defined within a program or a script. However, because the variable statement 64 represents the value of a property maintained at the server computer 30, other possible uses may be available.

Referring now to FIGS. 7A–7D, the process steps performed by the server computer 30 and the client computer 2 to expose and utilize server properties will be described. In particular, the operation of the client computer 2 will be described with reference to the routine 1100 and the operation of the server computer 30 will be described with respect to the routine 1150. The routines 1100 and 1150 will be described together to illustrate the operations performed by both the client computer 2 and the server computer 3 in conjunction with one another.

The logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as received within the claims attached hereto.

The routine 1100 begins at operation 1102, where the client computer 2 requests a Web page 26 from the server computer 30. The server computer 30 receives the request from the client computer 2 at operation 1152. From operation 1152, the routine 1150 continues to operation 1154, where the requested Web page 26 is retrieved. Once the requested Web page has been retrieved, the Web server application 32 begins rendering the various components of the Web page 26. As described briefly above, the Web page 26 may comprise an ASP.Net page or other type of server-side technology whereby the Web server application 32 renders the page in response to a request from a client computer.

At operation 1156, the Web server application 32 determines whether the Web page 26 includes one or more Web part objects 28. If the Web page 26 does not include Web part objects, the routine 1150 continues to operation 1158 where the requested Web page is generated and returned to the Web browser application 24 executing on the client computer 2. The client computer 2 receives the Web page at operation 1104 and renders the page displayable within the Web browser 24. From operation 1104, the routine 1100 continues to operation 1106, where it ends.

If, at operation 1156, it is determined that the Web page 26 includes a reference to one or more Web part objects 28, the routine 1150 branches from operation 1156 to operation 1160. At operation 1160, the Web server application 32 passes the request for the Web part object 28 to the WPA 34. It should be appreciated that each Web part object 28 has an associated WPA 34. Each request contained in the Web page 26 for a Web part object 28 is passed to the WPA 34 associated with the requested Web part object 28.

From operation 1160, the routine 1150 continues to operation 1162, where the WPA 34 identifies the location of the solution specification file 38 from the Web part properties 36 associated with the requested Web part object 28. As discussed above, the solution specification file 38 contains data indicating whether an object interface should be provided for the requested Web part object, parameters that define the interface, and a pointer to an XML map 40. As also discussed above, the XML map 40 identifies to the requested Web part object 28 the location of data 42 to be utilized by the Web part object 28, and also describes the format in which this data should be presented. Accordingly, the WPA 34 retrieves the solution specification file 38 and the XML map 40 at operation 1164.

At operation 1166, the WPA 34 determines whether the solution specification file 38 contains data indicating that an object interface should be provided for the requested Web part object 28. If the solution specification file 38 does indicate that one or more object interfaces should be provided for the Web part object, the routine 1150 continues to operation 1168. At operation 1168, the Web server application 32 renders either a provider interface script 46, a consumer interface script 48, or both, into the requested Web page 26. The rendered scripts are identified and constructed based on the contents of the solution specification file 38. From operation 1168, the routine 1150 continues to operation 1170.

If, at operation 1166, the WPA 34 determines that no object interfaces should be provided for the Web part object 28A, the routine branches from operation 1166 to operation 1170. At operation 1170, the Web server application 32 renders the Web part object tags 44A–44B for each Web part object 28 identified within the Web page 26. The routine 1150 then continues to operation 1172, where the Web server application 32 renders the WPSC 27 and the XML map 40. From operation 1174, the WPA 34 determines whether the solution specification file 38 includes any server property XML tags 60. If no such tags are present in the solution specification file 38, the routine 1150 branches to operation 1178. If, however, one or more server property tags 60 are present in the solution specification file 38, the routine 1150 continues to operation 1176.

At operation 1176, the WPA 34 locates on the server computer 30 the current value of each property identified by "STSNAME" parameters in a server property XML tag 60. For each such property, a variable statement is written to script contained within the Web page 26. Moreover, if a "SCRIPTREFERENCE" parameter is present in the XML tag, the property value is assigned to a variable having the name as set forth in the "SCRIPTREFERENCE" parameter. In this manner, the variable statement takes the form as specified and described above with reference to FIG. 6.

From operation 1176, the routine 1150 continues to decision operation 1178, where the WPA 34 determines whether the solution specification file 38 includes any arbitrary HTML. If the solution specification file 38 does not include any arbitrary HTML, the routine 1150 branches from operation 1178 to operation 1182. However, if arbitrary HTML is included in the solution specification file 38, the routine 1150 continues to render operation 1180. At operation 1180, the arbitrary HTML set forth in the solution specification file 38 is rendered into the Web page 26 following any variable statements. In this manner, the Web page 26 is constructed as described above with reference to FIG. 6.

Once the arbitrary HTML has been rendered at operation 1180, the routine 1150 continues to operation 1182, where the Web page 26 is transmitted to the client computer 2. It should be appreciated that the Web page 26 may be rendered all at once or may be rendered in a stream of data that is continuously transmitted from the server computer 30 to the Web browser application 24. The routine 1150 continues from operation 1174 to operation 1176, where it ends.

At operation 1108, the Web browser application 24 receives the Web page 26 and begins rendering the Web page 26 within the browser environment. In particular, displayable content is rendered displayable and script content is rendered within the scripting host portion of the Web browser application 24. In particular, at operation 1110, the Web part objects 28A–28B referenced within the Web page 26 are instantiated on the client computer 2. The WPSC 27, the provider interface script 46, and the consumer interface script 48 are rendered within the scripting host of the Web browser application 24 at operations 1112 and 1114, respectively.

At operation 1116, the instantiated Web part objects 28A–28B load their respective XML maps 40. Based upon the contents of the XML maps 40, the Web part objects 28 retrieve data 42 from the server computer 30 or from another network location. The server computer 30 provides the requested data to the Web part objects 28 at operation 1178. Once the Web part objects 28 have retrieved the data 42, this data is displayed in the manner set forth in the XML map 40. For instance, the XML map 40 may include data identifying where and how a spreadsheet table should be displayed by the Web part object 28.

At operation 1120, the Web browser application 24 renders any script contained within the arbitrary HTML within the scripting host. This may include, for example, rendering script that utilizes server property values set forth in variable statements. Additionally, the Web browser application 24 renders the contents of the Web page 26 to be viewable. This includes displaying output provided by the Web part objects 28 and any other viewable data contained on the Web page 26.

The routine 1100 continues to operation 1122, where system events are received and processed within the Web browser application 24. For instance, in one embodiment of the invention, the specified property value identifies the network location of a database gateway that may be utilized by a Web part object to locate and retrieve database information. This location may be continually utilized by a Web part object to retrieve and display information contained in a database. Other types of uses for property values maintained at a server computer should be apparent to those skilled in the art. It should also be appreciated that although the sequence of events described above with reference to the routines 1100 and 1150 have been described as executing in series, many of these events may actually execute in parallel. Moreover, each page may have any number of Web part objects contained therein. From 1122, the routine 1100 continues to block 1126, where it ends.

Based on the foregoing, it should be appreciated that the various embodiments of the invention provide a method, system, apparatus, and computer-readable medium for exposing server property values to a client application. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for exposing property values maintained at a server computer to an application executing on a client computer, the method comprising:

receiving, at the server computer, a request for a resource from the application executing on the client computer;

determining, at the server computer, whether a property value maintained at the server computer should be returned with the resource;

in response to determining, at the server computer, that the property value should be returned with the resource, retrieving, at the server computer, the current value of the property, wherein retrieving the current value comprises identifying a location of the property from an Extensible Markup Language (XML) map;

rendering, at the server computer, into the resource a variable statement specifying the current value of the property; and returning, from the server computer, the resource including the variable statement to the requesting application executing on the client computer.

2. The method of claim 1, wherein the resource comprises a page displayable by the application, and wherein determining whether a property value maintained at the server computer should be returned with the resource comprises determining whether a data file associated with the page includes a tag indicating that a property value should be returned with the resource.

3. The method of claim 2, wherein the tag comprises the name utilized by the server computer to identify the property value.

4. The method of claim 3, wherein the tag further comprises a name that should be utilized to refer to the property value within the variable statement.

5. The method of claim 4, further comprising after rendering the variable statement into the resource:

rendering into the resource program code utilizing the variable statement into the resource.

6. The method of claim 5, wherein the program code is specified in the data file data file that includes the tag indicating that the property value should be returned with the resource.

7. A computer-readable medium having stored thereon computer-executable instructions which, when executed by a computer, cause the computer to perform the method of claim 1.

8. A computer-controlled apparatus capable of performing the method of claim 1.

9. A system for exposing property values maintained at a server computer to an application executing on a client computer, the system comprising:

a server computer operative to;

receive a request from the application for a resource, determine whether a property value maintained at the server computer should be returned with the resource, retrieve a current value of the property, wherein retrieving the current value of the property comprises identifying a location of the property from an Extensible Markup Language (XML) map;

render into the resource a variable statement specifying the current value of the property in response to determining that the property value should be returned with the resource, and return the resource including the variable statement to the requesting application; and a client computer operative to;

generate the request to the server computer for the resource, receive the resource from the server computer, and execute program code for utilizing the variable statement returned with the resource.

10. The system of claim 9, wherein the resource comprises a web page displayable by the application, and wherein the server computer is operative to determine whether the property value should be returned with the resource comprises determining whether a solution specification file associated with the page includes a tag indicating that a property value should be returned with the resource.

11. The system of claim 10, wherein the tag comprises the name utilized by the server computer to identify the property value.

12. The system of claim 11, wherein the tag further comprises a name that should be utilized by the program code executing on the client computer to refer to the property value within the variable statement.

13. The system of claim 12, wherein the server computer is further operative to render into the resource the program code executed by the client computer to utilize the variable statement.

14. The system of claim 13, wherein the program code is contained within the solution specification file.

15. A computer-readable storage medium which stores a set of instructions which when executed performs a method for exposing a property value stored at a server computer to a client computer, the method executed by the set of instructions comprising:

receiving, at the server computer from the client computer, a request for a resource;

in response to receiving the request from the client computer, determining, at the server computer, that a server property tag indicates that a property value, maintained at the server computer, is to be exposed to the client computer within the resource requested by the client computer, the property value being stored in an extensible markup language data structure; and in response to determining that the server property tag indicates that the property value is to be exposed to the client computer, transmitting, from the server computer to the client computer, the property value within the resource requested by the client computer.

16. The computer-readable storage medium of claim 15, wherein determining that the server property tag indicates that the property value is to be exposed further comprises determining that the server property tag indicates that the property value is to be exposed wherein the server property tag further comprises a property parameter that identifies a name utilized by the server computer to identify the property value.

17. The computer-readable storage medium of claim 16, wherein determining that the server property tag indicates that the property value is to be exposed further comprises determining that the server property tag indicates that the property value is to be exposed wherein the server property tag further comprises a name parameter that identifies a name that should be utilized by the client computer to refer to the property value within a variable statement.

18. The computer-readable storage medium of claim 17, further comprising transmitting, from the server computer to the client computer, one or more data fields that include program code that may be executed on the client computer to utilize the variable statement.

19. A method for exposing property values maintained at a server computer to an object executing within a web browser on a client computer, the method comprising:
   receiving, at the server computer, a request for a displayable web page from the web browser executing on the client computer;
   consulting, at the server computer, a solution specification file associated with the web page to determine whether a property value maintained at the server computer should be returned with the web page;
   in response to determining, at the server computer, that the property value should be returned with the resource, retrieving, at the server computer, the current value of the property from a location within the server computer, wherein retrieving the current value comprises identifying a location of the property from an Extensible Markup Language (XML) map;
   rendering, at the server computer, into the web page a variable statement specifying the current value of the property; and
   returning, from the server computer, the web page, including the variable statement, to the requesting web browser executing on the client computer.

20. The method of claim 19, further comprising:
   retrieving from the solution specification file executable script that utilizes the variable statement; and
   rendering into the web page the executable script following the rendering of the variable statement.

21. The method of claim 20, further comprising:
   receiving the web page at the web browser; and
   executing the executable script within a script host provided by the web browser to thereby utilize the property value identified by the variable statement.

* * * * *